United States Patent

Matui

[11] 4,057,330
[45] Nov. 8, 1977

[54] LENS SYSTEM HAVING LARGE RELATIVE APERTURE AND LONG FOCUS

[75] Inventor: Sei Matui, Kawasaki, Japan

[73] Assignee: Nippon Kogaku K.K., Tokyo, Japan

[21] Appl. No.: 511,529

[22] Filed: Oct. 3, 1974

[30] Foreign Application Priority Data

Oct. 5, 1973    Japan .................. 48-111523

[51] Int. Cl.² .............................................. G02B 13/02
[52] U.S. Cl. ............................................. 350/223
[58] Field of Search ........................................ 350/223

[56] References Cited

FOREIGN PATENT DOCUMENTS 1,907    1/1972    Japan ....................... 350/223
595,422    12/1947    United Kingdom ............... 350/223

Primary Examiner—Conrad J. Clark
Attorney, Agent, or Firm—Shapiro and Shapiro

[57] ABSTRACT

A lens system comprising, as viewed from the object side, a first positive lens member having its convex surface facing the object side, a second positive lens member having its convex surface facing the object side, a third lens member, and a fourth positive lens member. The distance between the surface of the first lens member which faces the object side and the surface of the third lens member which faces the image side is from 0.4 times to 0.53 times the distance between the surface of the first lens member which faces the object side and the surface of the fourth lens member which faces the image side. The third lens member may comprise a positive lens and a negative lens which are joined together and which satisfy additional conditions.

4 Claims, 10 Drawing Figures

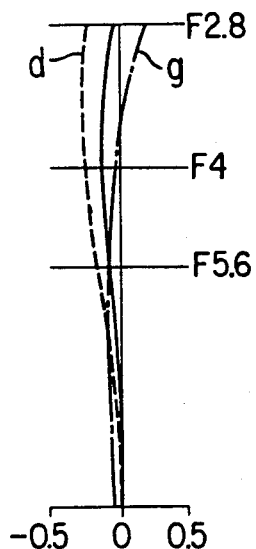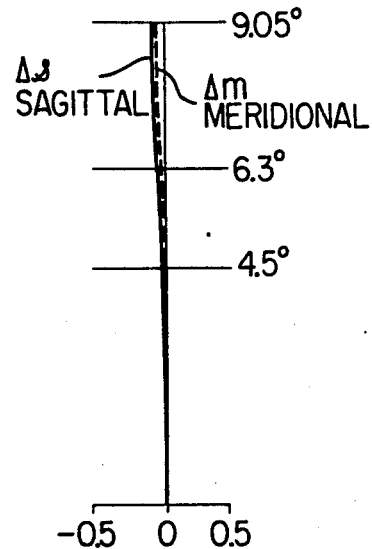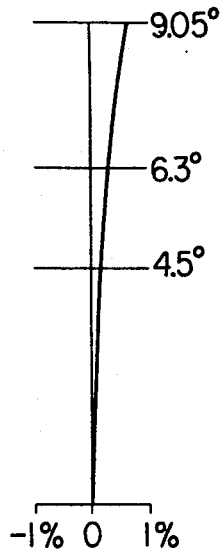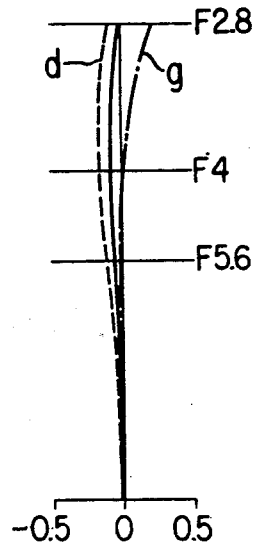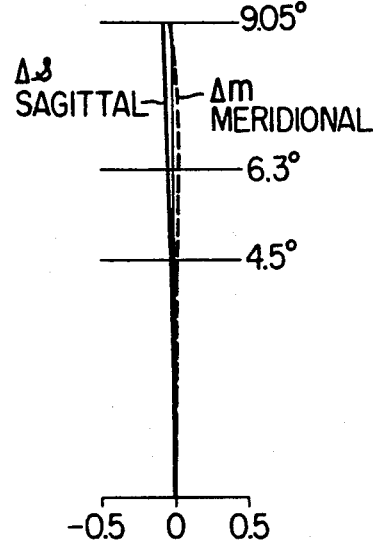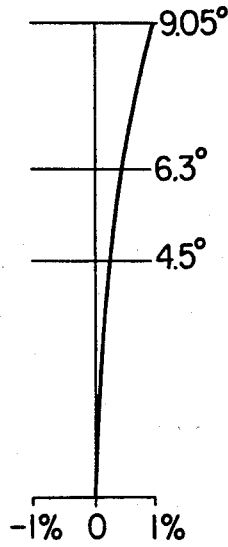

LENS SYSTEM HAVING LARGE RELATIVE APERTURE AND LONG FOCUS

BACKGROUND OF THE INVENTION

1. Field of the Invention

This invention relates to a compact lens system which has a large relative aperture and long focus but short total length and in which all aberrations are well corrected.

2. Description of the Prior Art

Among the conventional lenses which are constructed to have a large relative aperture are lenses known by the trade names Ernostar and Telezonar. In lenses of these types, aberrations such as coma, astigmatism, distortion, and axial and lateral chromatic aberrations are well corrected, but spherical aberration for short wavelengths near the g-line ($\lambda = 435.8$ m$\mu$) is extremely over-corrected. As a result, the performance of these lenses at full aperture is not completely satisfactory.

SUMMARY OF THE INVENTION

It is an object of the present invention to provide a lens system of large relative aperture and long focus which is well corrected for aberrations including spherical aberration for short wavelengths.

A lens system constructed in accordance with the invention comprises, as viewed from the object side, a first positive lens member having its convex surface facing the object side of the lens system, a second positive lens member having its convex surface facing the object side, a third lens member, and a fourth positive lens member, the distance between the surface of the first lens member which faces the object side and the surface of the third lens member which faces the image side being from 0.4 times to 0.53 times the distance between the surface of the first lens members which faces the object side and the surface of the fourth lens members which faces the image side of the lens system. The third lens members may comprise a positive lens and a negative lens which are joined together and which satisfy the following conditions:

$$0.4f \leq |r6| \leq 0.7f,$$

$$n3 > n4, \text{ and}$$

$$32 > \nu4 > \nu3,$$

where $f$ is the composite focal length of the entire lens system, $r6$ is the radius of curvature of the lens surfaces at the junction of the positive and negative lenses, $n3$ and $n4$ are the indices of refraction for the positive and negative lenses, respectively, and $\nu3$ and $\nu4$ are the Abbe numbers for the positive and negative lenses, respectively.

BRIEF DESCRIPTION OF THE DRAWINGS

The invention will be further described with reference to the accompanying drawings which illustrate preferred and exemplary embodiments, and wherein:

FIG. 2(a) illustrating spherical aberration and sine condition; FIG. 2(b), astigmatism; and FIG. 2(c), distortion;

FIGS. 3(a), 3(b) and 3(c) illustrate the aberrations for a second example of the lens system; and FIGS. 4(a), 4(b) and 4(c) illustrate the aberrations for a third example of the lens system.

DESCRIPTION OF THE PREFERRED EMBODIMENTS

Figure 1:
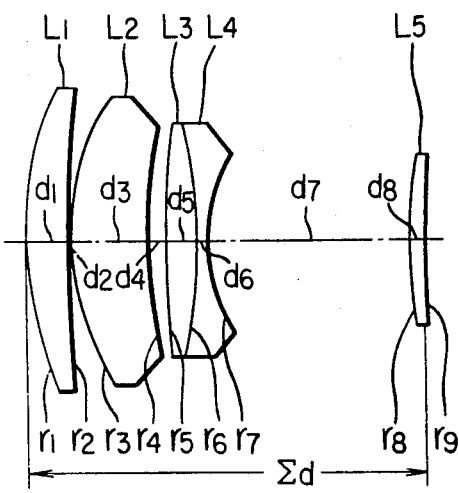
FIG. 1 is a cross-sectional view of the lens system constructed in accordance with the present invention.

Referring to FIG. 1, the preferred lens system in accordance with the present invention has a four-member, five-lens construction. As viewed from the object side, the first lens member comprises a positive meniscus lens L1 having its convex surface facing the object side, the second lens member comprises a positive meniscus lens L2 having its convex surface facing the object side, the third lens member comprises a biconvex positive lens L3 and a biconcave negative lens L4 which are joined together by cement, and the fourth member comprises a positive meniscus lens L5 which is separated from the lens L4 by a large air space, this lens having its convex surface facing the object side.

For reasons which will be discussed hereinafter, the components of the lens system in accordance with a preferred embodiment of the invention are arranged to satisfy both of the following two conditions:

(I) $0.4 \Sigma d \leq [d1 + d2 + d3 + d4 + d5 + d6] \leq 0.53 \Sigma d$, and (II) $0.4f \leq |r6| \leq 0.7f,$ $n3 > n4, 32 > \nu4 > \nu3,$ where $d$ ADSCRIPTS are the center thicknesses of the respective lenses and the air spaces between adjacent lenses, $\Sigma d$ is the total optical length of the lens system, $f$ is the composite focal length of the lens system, $r$ ADSCRIPTS are the radii of curvature of the surfaces of respective lenses, $n$ ADSCRIPTS are the indices of refraction for the glass used to make the respective lenses, and $\nu$ ADSCRIPTS are Abbe numbers for the respective lenses.

The above conditions will now be discussed. In order to reduce the over-correction of the spherical aberration for the short-wavelength light rays near the g-line ($\lambda = 435.8$ m$\mu$), it is preferred in principle to use, as the negative third lens member, a negative meniscus lens member (e.g., the combination of biconvex lens L3 and biconcave lens L4) having its concave surface looking toward the image side rather than to use a biconcave lens or a plano-concave lens, because a negative meniscus lens provides a more aplanatic condition than either of the other two types of lenses.

However, the declination at which the principal ray in an oblique beam directed toward the marginal area of the third lens member passes through the lens member gradually approaches the minimum level so that the desired effect of negating distortion produced in the positive direction by lenses L1 and L2 is reduced, with a result that most of the distortion generally remains in the positive direction. For the correction of such distortion, it is therefore desirable to minimize the value of ($d1 + d2 + d3 + d4 + d5 + d6$) with respect to $\Sigma d$ (the optical length of the entire system) so that the air space $d7$ between the lenses L4 and L5 has the greatest possible value. By providing such a large air space, the refractive power of the lens L5 is increased and the principal ray in the oblique beam can be made to enter the lens L5 at a high position for refraction therethrough. Thus, the distortion in the positive direction will be directed toward the negative direction.

However, if the value of $(d1 + d2 + d3 + d4 + d5 + d6)$ were reduced below the lower limit of $0.4 \Sigma d$ set forth in condition I, the rearward principal point of the entire system would approach the image side, greatly increasing the backfocus. As a result, it would be difficult to provide a compact lens system. Moreover, the distortion in the positive direction as well as other aberrations would be aggravated. Conversely, if the value of $(d1 + d2 + d3 + d4 + d5 + d6)$ should exceed the upper limit of $0.53 \Sigma d$ recited in condition I so that the air space between the lenses L4 and L5 is reduced, the desired effect of negating the distortion in the positive direction would be reduced and at the same time a coma would be created which could hardly be corrected by subsequent lens members.

By further increasing the degree of bending of the negative meniscus third lens member to provide a more aplanatic condition, the spherical aberration produced in the negative third lens member may be further reduced. However, the degree of bending is limited by the need to correct the other types of aberrations. Also, the complete correction of the spherical aberration by this means alone would be difficult to accomplish.

In accordance with condition II, the spherical aberration can be further corrected with respect to the short-wavelength rays near the g-line without increasing the various aberrations. More specifically, the overcorrection of the spherical aberration with respect to the short-wavelength rays may be further improved by employing, as the third lens member, a doublet comprising lenses L3 and L4 which are selected so that the radius of curvature $r6$ of the lens surfaces at the junction of the two lenses, the indices of refraction of the two lenses and the Abbe numbers of the glass materials used all satisfy condition II. The biconvex lens L3 is provided with the effect of directing the spherical aberration near the g-line toward the direction of under-correction, whereas the biconcave lens L4 has the counter effect to that of the biconvex lens L3. Therefore, in combination of the biconvex and biconcave lenses L3 and L4, the deterioration of such effect of directing the spherical aberration near the g-line toward the direction of under-correction tends to occur. In order to prevent such tendency, it is necessary to make use of the condition $n3 > n4$ as well as $\nu 4 > \nu 3$. Thus, the spherical aberration near the g-line may be corrected.

As $|r6|$ approaches the upper limit of $0.7f$ set forth in condition II, the desired effect of directing the spherical aberration for light having wavelengths near the g-line toward the direction of under-correction is reduced. Therefore, this must be compensated for by selecting lenses L3 and L4 which have high indices of refraction $n3$ and $n4$, respectively. If $|r6|$ were to exceed $0.7f$, selection of glass materials having the necessary indices of refraction would be difficult.

Conversely, as $|r6|$ approaches the lower limit of $0.4f$ recited in condition II, the spherical aberration would generally be directed toward the direction of under-correction. Consequently, this must be compensated for by selecting glass materials having low indices of refraction $n3$ and $n4$. However, the Abbe numbers $\nu 3$ and $\nu 4$ of such materials are increased to values which make them unsuitable for the correction of the axial and lateral chromatic aberrations. If $|r6|$ were selected below the lower limit of $0.4f$, it would be difficult to correct the balance between the spherical aberration and the chromatic aberration or the like. Furthermore, if Abbe numbers $\nu 3$ and $\nu 4$ were selected to be greater than 32, selection of a combination of glass materials from among the existing glass materials for the first and second lens groups would be impossible because Abbe numbers $\nu 1$ and $\nu 2$ are greater than 65. Thus, the correction of the axial and lateral chromatic aberrations would become extremely difficult.

According to the above-described lens construction and the given conditions, a compact lens system having a large relative aperture and long focus is obtained in which the aberrations, including spherical aberration for short wavelengths, are highly corrected.

Figures 2A, 2B, 2C:
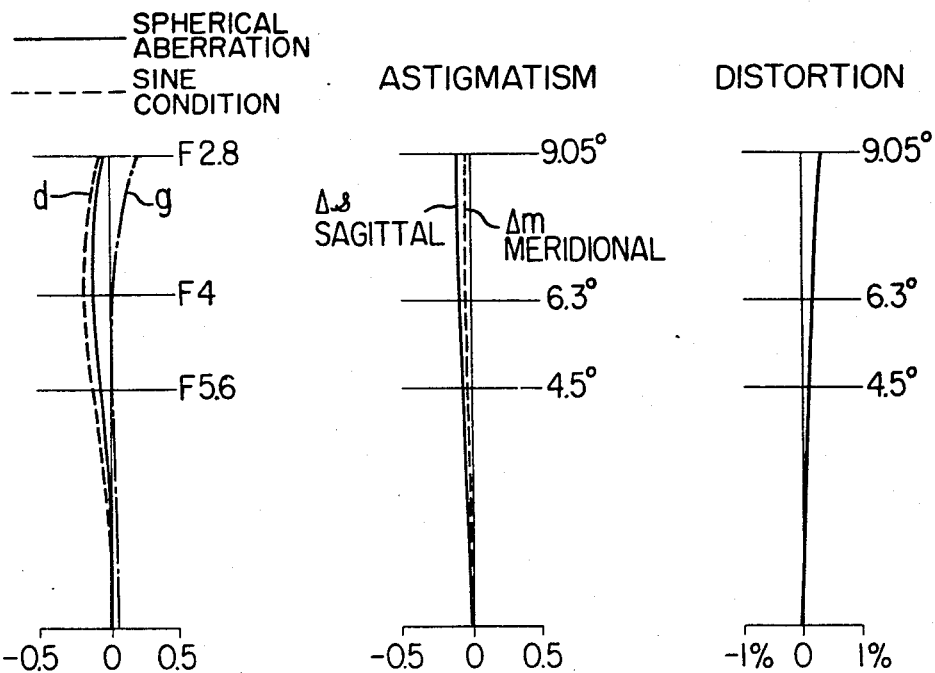
FIGS. 2(a), 2(b) and 2(c) are graphs illustrating the aberrations of a first example of the lens system.

The lens system of the invention will be described in greater detail with reference to the following three examples, each of which provides a lens system having a total composite focal length $f$ of 100 mm., a relative aperture of 1:2.8, and an angle of view of 18.1°. FIGS. 2(a), 2(b) and 2(c) illustrate the spherical aberration, sine condition, astigmatism and distortion for example 1, while FIGS. 3(a), 3(b) and 3(c) and FIGS. 4(a), 4(b) and 4(c) illustrate the same aberrations for examples 2 and 3, respectively.

EXAMPLE 1

| | | | |
|---|---|---|---|
| r1 = 40.444 | d1 = 5.407 | n1 = 1.6031 | ν1 = 65.41 |
| r2 = 289.580 | d2 = 0.444 | | |
| r3 = 30.222 | d3 = 9.630 | n2 = 1.6031 | ν2 = 65.41 |
| r4 = 67.912 | d4 = 2.074 | | |
| r5 = 173.333 | d5 = 3.481 | n3 = 1.69895 | ν3 = 30.0 |
| r6 = −40.741 | d6 = 1.111 | n4 = 1.68893 | ν4 = 31.1 |
| r7 = 19.884 | d7 = 30.000 | | |
| r8 = 62.222 | d8 = 1.630 | n5 = 1.7495 | ν5 = 35.0 |
| r9 = 195.494 | | | |

$$\frac{d1 + d2 + d3 + d4 + d5 + d6}{\Sigma d} = \frac{22.147}{53.777} = 0.412$$

EXAMPLE 2

| | | | |
|---|---|---|---|
| r1 = 41.630 | d1 = 5.407 | n1 = 1.62041 | ν1 = 60.3 |
| r2 = 300.296 | d2 = 0.444 | | |
| r3 = 28.778 | d3 = 9.630 | n2 = 1.62041 | ν2 = 60.3 |
| r4 = 61.593 | d4 = 2.074 | | |
| r5 = 157.876 | d5 = 3.481 | n3 = 1.78470 | ν3 = 26.1 |
| r6 = −58.637 | d6 = 1.111 | n4 = 1.74000 | ν4 = 28.2 |
| r7 = 19.616 | d7 = 25.704 | | |
| r8 = 62.222 | d8 = 1.630 | n5 = 1.72825 | ν5 = 28.3 |
| r9 = 186.713 | | | |

$$\frac{d1 + d2 + d3 + d4 + d5 + d6}{\Sigma d} = \frac{22.147}{49.481} = 0.447$$

EXAMPLE 3

| | | | |
|---|---|---|---|
| r1 = 41.407 | d1 = 5.407 | n1 = 1.60881 | ν1 = 58.9 |
| r2 = 288.507 | d2 = 0.444 | | |
| r3 = 28.000 | d3 = 9.630 | n2 = 1.60881 | ν2 = 58.9 |
| r4 = 59.138 | d4 = 2.074 | | |
| r5 = 191.111 | d5 = 3.481 | n3 = 1.91761 | ν3 = 21.4 |
| r6 = −68.889 | d6 = 1.111 | n4 = 1.80518 | ν4 = 25.5 |
| r7 = 20.221 | d7 = 18.000 | | |
| r8 = 76.296 | d8 = 1.630 | n5 = 1.72825 | ν5 = 28.3 |
| r9 = 1750.370 | | | |

$$\frac{d1 + d2 + d3 + d4 + d5 + d6}{\Sigma d} = \frac{22.147}{41.777} = 0.530$$

It is believed that the advantages and improved results furnished by the lens system of the invention will be apparent from the foregoing description of several preferred embodiments thereof. Various changes and modifications may be made without departing from the spirit and scope of the invention, as sought to be defined in the following claims.

I claim:

1. A lens system having a large relative aperture and long focus and having an object side and an image side, the system comprising, in series, as viewed from the object side, a positive first lens member having its convex surface facing the object side, a positive second lens member having its convex surface facing the object side, a negative third lens member, and a positive fourth lens member, the third lens member comprising a positive lens and a negative lens, the components of the lens system satisfying the following conditions:

(I) $0.4 \Sigma d \leq [d1 + d2 + d3 + d4 + d5 + d6] \leq 0.53 \Sigma d$, and (II) $0.4f \leq |r6| \leq 0.7f$, $n3 > n4$, $32 > \nu 4 > \nu 3$, where $d$ ADSCRIPTS are the center thicknesses of the respective lenses and the air spaces between adjacent lenses, $\Sigma d$ is the total optical length of the lens system, $f$ is the composite focal length of the lens system, $r$ ADSCRIPTS are the radii of curvature of the surfaces of respective lenses, $n$ ADSCRIPTS are the indices of refraction for the glass used to make the respective lenses, and $\nu$ ADSCRIPTS are Abbe numbers for the respective lenses.

2. A lens system having a large relative aperture and long focus and having an object side and an image side, the system comprising, in series, as viewed from the object side, a positive first lens member having its convex surface facing the object side, a positive second lens member having its convex surface facing the object side, a negative third lens member, and a positive fourth lens member, the third lens member comprising a positive lens and a negative lens, the components of the lens system satisfying the following conditions:

(I) $0.4 \Sigma d \leq [d1 + d2 + d3 + d4 + d5 + d6] \leq 0.53 \Sigma d$, and (II) $0.4f \leq |r6| \leq 0.7f$, $n3 > n4$, $32 > \nu 4 > \nu 3$, where $d$ ADSCRIPTS are the center thicknesses of the respective lenses and the air spaces between adjacent lenses, $\Sigma d$ is the total optical length of the lens system, $f$ is the composite focal length of the lens system, $r$ ADSCRIPTS are the radii of curvature of the surfaces of respective lenses, $n$ ADSCRIPTS are the indices of refraction from the glass used to make the respective lenses, and $\nu$ ADSCRIPTS are Abbe numbers for the respective lenses; the lens system having a total composite focal length of 100mm, a relative aperture of 1:2.8, and an angle of view of 18.1° and the following specifications:

| r1 = 40.444 | d1 = 5.407 | n1 = 1.6031 | $\nu 1$ = 65.41 |
|---|---|---|---|
| r2 = 289.580 | d2 = 0.444 | | |
| r3 = 30.222 | d3 = 9.630 | n2 = 1.6031 | $\nu 2$ = 65.41 |
| r4 = 67.912 | d4 = 2.074 | | |
| r5 = 173.333 | d5 = 3.481 | n3 = 1.69895 | $\nu 3$ = 30.0 |
| r6 = −40.741 | d6 = 1.111 | n4 = 1.68893 | $\nu 4$ = 31.1 |
| r7 = 19.884 | d7 = 30.000 | | |
| r8 = 62.222 | d8 = 1.630 | n5 = 1.7495 | $\nu 5$ = 35.0 |
| r9 = 195.494 | | | |

$$\frac{d1 + d2 + d3 + d4 + d5 + d6}{\Sigma d} = \frac{22.147}{53.777} = 0.412$$

3. A lens system having a large relative aperture and long focus and having an object side and an image side, the system comprising, in series, as viewed from the object side, a positive first lens member having its convex surface facing the object side, a positive second lens member having its convex surface facing the object side, a negative third lens member, and a positive fourth lens member, the third lens member comprising a positive lens and a negative lens, the components of the lens system satisfying the following conditions:

(I) $0.4 \Sigma d \leq [d1 + d2 + d3 + d4 + d5 + d6] \leq 0.53 \Sigma d$, and (II) $0.4f \leq |r6| \leq 0.7f$, $n3 > n4$, $32 > \nu 4 > \nu 3$, where $d$ ADSCRIPTS are the center thicknesses of the respective lenses and the air spaces between adjacent lenses, $\Sigma d$ is the total optical length of the lens system, $f$ is the composite focal length of the lens system, $r$ ADSCRIPTS are the radii of curvature of the surfaces of respective lenses, $n$ ADSCRIPTS are the indices of refraction for the glass used to make the respective lenses, and $\nu$ ADSCRIPTS are Abbe numbers for the respective lenses; the lens system having a total composite focal length of 100mm, a relative aperture of 1:2.8, and an angle of view of 18.1° and the following specifications:

| r1 = 41.630 | d1 = 5.407 | n1 = 1.62041 | $\nu 1$ = 60.3 |
|---|---|---|---|
| r2 = 300.296 | d2 = 0.444 | | |
| r3 = 28.778 | d3 = 9.630 | n2 = 1.62041 | $\nu 2$ = 60.3 |
| r4 = 61.593 | d4 = 2.074 | | |
| r5 = 157.876 | d5 = 3.481 | n3 = 1.78470 | $\nu 3$ = 26.1 |
| r6 = −58.637 | d6 = 1.111 | n4 = 1.74000 | $\nu 4$ = 28.2 |
| r7 = 19.616 | d7 = 25.704 | | |
| r8 = 62.222 | d8 = 1.630 | n5 = 1.72825 | $\nu 5$ = 28.3 |
| r9 = 186.713 | | | |

$$\frac{d1 + d2 + d3 + d4 + d5 + d6}{\Sigma d} = \frac{22.147}{49.481} = 0.447.$$

4. A lens system having a large relative aperture and long focus and having an object side and an image side, the system comprising, in series, as viewed from the object side, a positive first lens member having its convex surface facing the object side, a positive second lens member having its convex surface facing the object side, a negative third lens member, and a positive fourth lens member, the third lens member comprising a positive lens and a negative lens, the components of the lens system satisfying the following conditions:

(I) $0.4 \Sigma d \leq [d1 + d2 + d3 + d4 + d5 + d6] \leq 0.53 \Sigma d$, and (II) $0.4f \leq |r6| \leq 0.7f$, $n3 > n4$, $32 > \nu 4 > \nu 3$, where $d$ ADSCRIPTS are the center thicknesses of the respective lenses and the air spaces between adjacent lenses, $\Sigma d$ is the total optical length of the lens system, $f$ is the composite focal length of the lens system, $r$ ADSCRIPTS are the radii of curvature of the surfaces of respective lenses, $n$ ADSCRIPTS are the indices of refraction for the glass used to make the respective lenses, and $\nu$ ADSCRIPTS are Abbe numbers for the respective lenses; the lens system having a total composite focal length of 100mm, a relative aperture of 1:2.8, and an angle of view of 18.1° and the following specifications:

| r1 = 41.407 | d1 = 5.407 | n1 = 1.60881 | $\nu 1$ = 58.9 |
|---|---|---|---|
| r2 = 288.507 | d2 = 0.444 | | |
| r3 = 28.000 | d3 = 9.630 | n2 = 1.60881 | $\nu 2$ = 58.9 |
| r4 = 59.138 | d4 = 2.074 | | |
| r5 = 191.111 | d5 = 3.481 | n3 1.91761 | $\nu 3$ = 21.4 |
| r6 = −68.889 | d6 = 1.111 | n4 = 1.80518 | $\nu 4$ = 25.5 |
| r7 = 20.221 | d7 = 18.000 | | |
| r8 = 76.296 | d8 = 1.630 | n5 = 1.72825 | $\nu 5$ = 28.3 |
| r9 = 1750.370 | | | |

$$\frac{d1 + d2 + d3 + d4 + d5 + d6}{\Sigma d} = \frac{22.147}{41.777} = 0.530$$

* * * * *